United States Patent [19]
Masui et al.

[11] Patent Number: 4,637,945
[45] Date of Patent: Jan. 20, 1987

[54] ANTI-STATIC JACKET FOR FLOPPY DISK

[75] Inventors: Takeshi Masui, Konosu; Morio Sano, Tokyo, both of Japan

[73] Assignee: Denki Kagaku Kogyo Kabushiki Kaisha, Tokyo, Japan

[21] Appl. No.: 733,283

[22] Filed: May 10, 1985

[30] Foreign Application Priority Data

Jul. 23, 1984 [JP] Japan .............................. 59-111347[U]

[51] Int. Cl.$^4$ .............................................. B32B 27/00
[52] U.S. Cl. ...................................... 428/35; 428/286; 428/290
[58] Field of Search ........................... 428/290, 35, 286

[56] References Cited

U.S. PATENT DOCUMENTS 4,511,610  4/1985  Yazaki et al. .......................... 428/35

Primary Examiner—Marion C. McCamish
Attorney, Agent, or Firm—Jordan and Hamburg

[57] ABSTRACT

According to the invention a jacket for floppy disk is provided. The jacket comprises an exterior layer and an interior layer. The exterior layer is made of an antistatic styrene base resin composition. The interior layer is a non-woven cloth layer.

27 Claims, No Drawings

ANTI-STATIC JACKET FOR FLOPPY DISK

BACKGROUND OF THE INVENTION

1. Field of the Invention

The present invention relates to a jaceket for containing therein a floppy disk.

2. Related Art Statement

The conventional jacket for floppy disks is generally manufactured by bonding a non-woven cloth to a sheet mainly composed of a hard polyvinylchloride followed by cutting and folding operations. The heat distortion temperature thereof is 60° to 70° C., at most, since it is mainly composed of a polyvinylchloride. For this reason, if the non-woven cloth is laminated at a high temperature, the sheet is deformed or the pattern of the non-woven cloth is transferred onto the surface opposed to the laminated interface, leading to considerable reduction in commercial value. In addition, loss in laminating step is significant, since the employable temperature range for the lamination with the non-woven cloth is narrow.

Furthermore, toxic gases are generated by the heating at the hot-lamination or folding step to cause environmental pollution problems. Setting aside the disadvantages described above, since the floppy disks are carried under various conditions, there is an increasing demand for a floppy disk jacket having a resistance to higher temperature.

Moreover, a multi-ply material having a thin colored resin ply and a light impermeable ply could not be manufactured from a polyvinylchloride resin through an extrusion process due to the problem of thermal stability of the polyvinylchloride resin. Accordingly, a floppy disk jacket made of a polyvinylchloride resin having a colored layer could not be produced.

OBJECTS AND SUMMARY OF THE INVENTION

A primary object of this invention is to provide a floppy disk jacket improved in heat resistant property and having antistatic characteristics by laminating an antistatic styrene base resin sheet and a non-woven cloth.

Another object of this invention is to provide a floppy disk jacket improved in commercial value, wherein the pattern of the non-woven cloth is not transferred at the step of hot lamination with the non-woven cloth.

A further object of this invention is to provide a floppy disk jacket made of a material which can be processed in a temperature range wider than that for a hard polyvinylchloride resin to improve efficiency of lamination operation.

A still further object of this invention is to provide a floppy disk jacket which can be manufactured without generating toxic gases at the hot lamination and hot folding steps.

Yet a further object of this invention is to provide floppy disk jackets having exterior layers of different colors to allow easy distinction therebetween in assortment for different applications, users or types of machine.

The above and other object of this invention will become apparent from the following description of the invention.

A jacket for floppy disk, provided in accordance with the invention, comprises an exterior layer made of an antistatic styrene base resin composition, and an interior non-woven cloth layer laminated internally of the exterior layer.

DESCRIPTION OF THE INVENTION

The present invention will now be described more specifically in the following detailed description.

The jacket for floppy disk, provided in accordance with the invention, comprises an exterior layer made of an antistatic styrene base resin composition, and an interior non-woven cloth layer laminated internally of the exterior layer. The exterior layer may be a single-ply layer of an antistatic styrene base resin; a double-ply layer including an antistatic styrene base resin ply and a non-conductive layer of another styrene base resin ply; or a triple-ply layer including a nonconductive styrene base intermediate ply sandwiched between two antistatic styrene base resin plies. The double-ply and triple-ply layers may be produced by a one-step co-extrusion process, or the respective plies may be produced separately and may be bonded. The co-extrusion process may be combined with the latter mentioned process.

The styrene base resins usable in the invention include high impact strength styrene resins, mixtures of a styrene resin for general uses mixed with at least 20 wt% of a high impact strength styrene resin, acrylonitrile/styrene/butadiene copolymers, methacrylonitrile/styrene/butadiene copolymers, styrene/butadiene block copolymers, acrylonitrile/acrylic rubber/styrene copolymers, acrylonitrile/ethylenepropylene rubber/styrene copolymers, acrylonitrile/chlorosulfonated ethylene/styrene copolymers, acrylonitrile/α-methylstyrene/butadiene copolymers, and blends thereof. It is preferable to use acrylonitrile/styrene/butadiene copolymers or acrylonitrile/α-methylstyrene/butadiene copolymers, whereby particularly high heat resistant products may be prepared.

An antistatic styrene base resin composition may be prepared by adding an antistatic agent to a styrene base resin, or an antistatic styrene resin layer may be prepared by coating the layer with an antistatic agent. For this purpose, nonionic and anionic surfactants may be used, particularly preferred surfactants being, for example N,N-bis(2-hydroxyethyl)tallow amine, polyoxyethylene lauryl amine and fatty acid esters of polyoxyethylene lauryl amine. The added amount of such an antistatic agent may range within 0.1 to 7 parts by weight, preferably 0.5 to 5 parts by weight, based on 100 parts by weight of the used styrene base resin. If the added amount of antistatic agent is less than 0.1 parts by weight, the antistatic effect of the resultant resin composition does not reach satisfactory level so that dusts tend to adhere on the product jacket. On the contrary, if the added amount exceeds 7 parts by weight, the resultant resin composition has an extreme lubricant effect to cause slip at the extrusion step or the excessive antistatic agent tends to bleed to the surface of the exterior layer. When an antistatic agent is coated on the exterior layer, the thickness of coating should range within 0.001 to 0.1 g/m$^2$, preferably within 0.005 to 0.05 g/m$^2$, based on solids content. If the coating is thinner than the aforementioned range, satisfactory antistatic effect cannot be obtained and if the thickness of the coating is larger than 0.1 g/m$^2$, the resultant exterior layer becomes disadvantageously sticky.

The antistatic styrene base resin composition may otherwise be prepared by adding conductive carbon black, such as S.C.F. (Super Conductive Furnace), E.C.F. (Electric Conductive Furnace), Ketjen Black EC (Trade Name of the product available from Lion-AKZO Co., Ltd.) or acetylene black, to a styrene base resin; or may be prepared by adding a conductive metal, such as copper, aluminum, iron, nickel or stainless steel to a styrene base resin. It is desirous that the carbon black be added in an amount of from 3 to 35 parts by weight, preferably from 5 to 20 parts by weight, to 100 parts by weight of the styrene base resin. It is desirous that the conductive metal be added in an amount of from 2 to 25 parts by weight, preferably from 5 to 20 parts by weight, to 100 parts by weight of the styrene base resin. A mixture of two or more antistatic agents, conductive carbon blacks and/or conductive metals may be used. When an exterior layer of multi-ply structure is used, the nonconductive ply may be added with a nonconductive carbon black, such as furnace carbon or channel black, may be added to the matrix styrene base resin in an amount of 0.1 to 10 parts by weight based on 100 parts by weight of the resin for shielding. A stronger layer may be provided by a multi-ply structure, as compared to a single-ply layer.

In the present invention, the interior non-woven cloth layer may be made of polyester, rayon or aromatic polyamide fiber or rock wool. The exterior layer and the interior layer may be bonded by hot-fusing at about 160° C. to 240° C.

The jaceket for floppy disk, according to the present invention, may include an intermediate layer extending between the exterior layer and the interior layer, and the exterior and intermediate layers may contain coloring agents, respectively. With this construction, the total light transmittance through the exterior and intermediate layers should be not more than 1%. If the light transmittance exceeds 1%, there arises a risk that the positioning of the floppy disk cannot be carried out. The merit of this construction resides in that jackets having different colors may be produced to facilitate easy assortment for assorting the floppy disks in the jackets with individual applications, users or types of machine in which the floppy disks are inserted. It is desirous that coloring agents, other than black, such as red, yellow, orange and blue coloring agents, may be used in the exterior layer. The color tone may be adjusted by using the same coloring agent in the exterior and intermediate layers, with the color densities of respective layers being varied. The amount of the coloring agent in the intermediate layer may be decreased as compared to that in the exterior layer to provide an intermediate layer having a higher mechanical strength. Otherwise, the coloring agent contained in the exterior layer may be different from that contained in the intermediate layer, for example, a blue coloring agent in the exterior layer and a black coloring agent in the intermediate layer, to reduce the light transmittance considerably.

Any of dyestuffs, inorganic pigments and organic pigments may be used as the coloring agents, and the added amount of the coloring agents is not critical unless the properties of resin are not significantly affected and as far as the light transmittance is maintained at not more than 1%.

The exterior layer made of an antistatic styrene base resin composition containing any one or more coloring agents may be a singly-ply structure, or may be a double-ply structure including an antistatic styrene base resin composition ply and a nonconductive styrene base resin composition ply containing a coloring agent. By the provision of a double-ply intermediate layer, with the ply closer to the exterior layer containing a white coloring agent or containing the same coloring agent as that contained in the exterior layer in an amount different from the amount thereof contained in the exterior layer, a product having a beautiful appearance which is not adversely affected by the coloring agent in the intermediate layer may be formed. The intermediate layer may be a structure having triple or more plies, if necessary. The layer containing double or more plies may be produced by any of co-extrusion, lamination or combination thereof.

In a further embodiment of the invention, an adhesive layer made of an olefinic copolymer or a mixture of an olefinic copolymer with a styrene base resin may be provided between the exterior and interior layers. The resin composition used for the adhesive layer should be adhesive to both of the non-woven cloth and the exterior layer, preferable examples therefor being olefinic copolymers such as ethylenic copolymers, or modified olefinic copolymers. These resins may be used singly or in combination with the matrix styrene base resin used in the exterior layer. Examples of usable ethylenic copolymers are those selected from copolymers of ethylene with vinyl acetate, butene-1 or the like; and example of the usable modified olefinic copolymers are copolymers of olefin-2 modified with unsaturated carboxylic acids or anhydrides thereof; the most preferred being modified ethylene/vinyl acetate copolymers. When such an olefinic copolymer or modified olefinic copolymer is used by mixing with a matrix styrene base resin, it is preferable that the content of styrene base resin be not more than 90 wt%, and the adhesive strength at the lamination interface with the non-woven cloth is lowered to unsatisfactory level if the content thereof exceeds 90 wt%.

The exterior and intermediate layers of the laminates of the invention may be added with inorganic fillers, ultraviolet ray absorber and/or other additives, if desired. The exterior layer may carry a printing.

The multi-layer sheet used for the production of the jacket for floppy disks, according to the present invention, has a thickness normally ranging from 300 to 600 microns, with the preferable thickness of the exterior layer ranging from 150 to 280 microns, the total thickness of exterior layer plus intermediate layer being preferably within about 150 to 350 microns, to produce a jacket having sufficient strength.

EXAMPLES OF THE INVENTION

The present invention will be described in detail by referring to specific examples thereof.

In the following Examples, the numerals in parentheses indicate, respectively, the commercially available materials which will be listed hereinafter.

EXAMPLE 1

Using a 40 m/m extruder, a single-layer sheet having a thickness of 240 microns was extruded from a resin composition containing 100 parts by weight of an ABS resin (1), 5 parts by weight of an antistatic agent (5) and 3 parts by weight of a nonconductive carbon black (8). Then, the temperature at the step of laminating the same with a polyester non-woven cloth was varied, while measuring the temperature conditions through a unit sealer, to produce multi-layer sheets. The temperature conditions and the results are shown in Table 1. Each multi-layer sheet is cut into a 170×300 m/m piece, with the sheet laminated with the non-woven cloth at 200° C., followed by folding at 180° C. to form a 5 inch square floppy disk jacket and then heat-sealing the marginal areas at 220° C. to produce a jacket.

The thus produced jacket had good appearance without transfer of the non-woven cloth pattern and any deformation, and no bad odor was sensed at the heat treatments in the step of laminating with the non-woven cloth and also in the step of folding. The percent elongation by heating had an equivalent value at a temperature of higher than about 20° C. as the corresponding value shown by Comparative Example 1, which revealed improved heat resistant property of the jacket of the invention.

EXAMPLE 2

Through a co-extrusion process, extruded was a double-ply sheet including 25 micron thick first resin ply made of a composition composed of 100 parts by weight of a high impact strength styrene resin (4), 3 parts by weight of an antistatic agent (6) and 3 parts by weight of a nonconductive carbon black, and a 200 micron thick second resin ply made of a composition composed of 100 parts by weight of a high impact strength styrene resin (4) and 3 parts by weight of a nonconductive carbon black. Similarly as in Example 1, the temperature at the step of laminating the same with a polyester non-woven cloth was varied, while measuring the temperature conditions through a unit sealer, to produce multi-layer sheets. The temperature conditions and the results are shown in Table 1. A jacket was produced by folding the material sheet at a temperature of 170° C. followed by heat-sealing at 160° C.

The thus produced jacket had good appearance without transfer of the non-woven cloth pattern and any deformation, and no bad odor was sensed at the heat treatments in the step of laminating with the non-woven cloth and also in the step of folding. The resistance to heat of the product was improved over that of Comparative Example 1.

EXAMPLE 3

Through a co-extrusion process, extruded was a triple-ply sheet including a 180 micron thick core resin ply made of a composition composed of 100 parts by weight of an ABS resin (2) and 2 parts by weight of a nonconductive carbon black (8), and two overcoat plies each having a thickness of 20 microns and composed of a composition composed of 100 parts by weight of an ABS resin (3), 10 parts by weight of a nonconductive carbon black (8) and 3 parts by weight of an antistatic agent.

Similarly as in Example 1, the temperature at the step of laminating the same with a polyester non-woven cloth was varied, while measuring the temperature conditions through a unit sealer, to produce multi-layer sheets. The temperature conditions and the results are shown in Table 1.

A jacket was produced by folding the material sheet at a temperature of 210° C. followed by heat-sealing at 230° C.

The thus produced jacket had good appearance without transfer of the non-woven cloth pattern and any deformation, and no bad odor was sensed at the heat treatments in the step of laminating with the non-woven cloth and also in the step of folding. The percent elongation by heating had an equivalent value at a temperature of higher than about 30° C. as the corresponding value shown by the Comparative Example 1, which showed improved thermal characteristics of the jacket of the invention.

COMPARATIVE EXAMPLE 1

The conditions at the lamination step was tested similarly as in Example 1, except that a hard polyvinylchloride resin was used in place of the exterior layer in Example 1. The results are shown in Table 1. The temperature range pertinent for lamination operation was very narrow, as shown.

TABLE 1

| | Lamination Condition | | | Strength of Laminate | Transfer of Non-Woven Cloth Pattern | Percent Elongation of sheet (%) | | | | | | | |
|---|---|---|---|---|---|---|---|---|---|---|---|---|---|
| | | | | | | 90° C. × 30 Min. | | 100° C. × 30 Min. | | 110° C. × 30 Min. | | 120° C. × 30 Min. | |
| | Temp. (°C). | Pressure (Kg/cm² G) | Time (Sec.) | | | Lengthwise | Transverse | Lengthwise | Transverse | Lengthwise | Transverse | Lengthwise | Transverse |
| Example 1 | 170 | 0.5 | 0.5 | O | O | 0 | 0 | 0 | +0.1 | −1.0 | +0.6 | −4.0 | +0.7 |
| | 190 | 0.5 | 0.5 | O | O | | | | | | | | |
| | 210 | 0.5 | 0.5 | O | O | | | | | | | | |
| | 220 | 0.5 | 0.5 | O | O | | | | | | | | |
| 2 | 160 | 0.5 | 0.5 | O | O | −0.5 | +0.2 | −2.1 | +0.6 | −4.3 | +0.9 | −7.2 | +1.0 |
| | 180 | 0.5 | 0.5 | O | O | | | | | | | | |
| | 200 | 0.5 | 0.5 | O | O | | | | | | | | |
| | 220 | 0.5 | 0.5 | O | O | | | | | | | | |
| | 230 | 0.5 | 0.5 | O | O | | | | | | | | |
| 3 | 180 | 0.5 | 0.5 | O | O | 0 | 0 | 0 | 0 | 0 | +0.1 | −1.0 | +0.4 |
| | 200 | 0.5 | 0.5 | O | O | | | | | | | | |
| | 220 | 0.5 | 0.5 | O | O | | | | | | | | |
| | 240 | 0.5 | 0.5 | O | O | | | | | | | | |
| Comp. Ex. 1 | 150 | 0.5 | 0.5 | Δ | O | −1.7 | +1.1 | −6.5 | +4.5 | −7.8 | +4.3 | −10.1 | +5.2 |
| | 160 | 0.5 | 0.5 | O | O | | | | | | | | |
| | 170 | 0.5 | 0.5 | O | O | | | | | | | | |
| | 180 | 0.5 | 0.5 | O | Δ | | | | | | | | |

The machine and starting materials used, the test methods and appraisals of the results thereof will be listed as follows.

Unit Sealer: Produced by Ooyoshi Co.
Determination of Properties:
 1 Strength of Laminate:
  The exterior resin layer was peeled from the nonwoven cloth by hands. O indicates that the nonwoven cloth was broken, and Δ indicates that the laminate layer was peeled off at the interface.

2 Transfer of Non-woven Cloth Pattern:

Transfer of pattern was visually observed.

O indicates that no transfer was observed,

Δ indicates that some transfer was observed, and

X indicates that appreciable transfer was observed.

The components used in Examples 1 to 3 and Comparative Example 1 were as follow:

(1) ABS Resin: Available from Denki Kagaku Kogyo K.K. under the Trade Name of Denka ABS, GR-2000

(2) ABS Resin: Available from Denki Kagaku Kogyo K.K. under the Trade Name of Denka ABS, HM (3) ABS Resin: Available from Denki Kagaku Kogyo K.K. under the Trade Name of Denka ABS, HH (4) High Impact Strength Styrene Resin: Available from Denki Kagaku Kogyo K.K. under the Trade Name of Denka Styrol HI-R-5

(5) Antistatic Agent: Available from Sanyo Kasei Kogyo K.K. under the Trade Name of Chemistat 3033

(6) Antistatic Agent: Available from Kao Soap co., Ltd. under the Trade Name of Electrostripper PC (7) Antistatic Agent: Available from Kao Soap Co., Ltd. under the Trade Name of Electrostripper EA (8) Nonconductive Carbon Black: Available from Mitsubishi Carbon Co., Ltd. under the Trade Indication of MA-100

Example 4

A co-extrusion equipment including two 40 mm extruders and one 65 mm extruder was used to extrude the combination of the top skin ply, the core or substrate ply and the bottom skin ply to prepare a triple-ply sheet having a total thickness of 230 microns and a width of 500 mm, from the composition shown in Table 2. The composition used for forming the top skin ply contained 2 parts by weight of an alkylamine base antistatic agent, available from Kao Soap Co., Ltd. under the Trade Name of "Electrostripper PC" to 100 parts by weight of the ABS resin. The light transmittance of the thus produced sheet was measured. The result is shown in Table 2. The sheet was then cut into a sheet having a length of 290 mm and a width of 170 mm, followed by hot fusing the surface of the bottom skin layer with a non-woven cloth, and a jacket for a 5½ inch floppy disk was manufactured therefrom. The observed appearance of the jacket is shown also in Table 2.

Both of the light transmittance and appearance were satisfactory.

EXAMPLES 5 TO 8

Using the same co-extrusion equipment as used in Example 4, the resin compositions shown in Table 2 were extruded to form respective plies of respective runs. After extrusion, the surface of the top skin layer of each run was coated with an alkylamine base antistatic agent available from Kao Soap Co., Ltd. under the Trade Name of "Electrostripper QN" to form a 0.02 g/m² thick coating. After bonding the bottom skin ply with a non-woven cloth by hot fusing, a jacket for a 5¼ inch floppy disk was manufactured therefrom and the appearance of the jacket was inspected.

Both of the light transmittance and appearance were satisfactory.

TABLE 2

| | | (parts by weight) Example | | | | |
|---|---|---|---|---|---|---|
| | | 4 | 5 | 6 | 7 | 8 |
| Composition | | | | | | |
| Top Skin Ply | ABS Resin (1) | 84 | 80 | 90 | — | 92 |
| | ABS Resin (2) | 8 | 12 | 10 | — | — |
| | PS Resin | — | — | — | 90 | — |
| | Coloring Agent (1) | 8 | — | — | — | 8 |
| | Coloring Agent (2) | — | 8 | — | — | — |
| | Coloring Agent (3) | — | — | 10 | — | — |
| | Coloring Agent (4) | — | — | — | 10 | — |
| | Thickness (μ) | 30 | 20 | 30 | 30 | 160 |
| Core Ply | ABS Resin (1) | 99 | 98 | 99 | 100 | — |
| | Coloring Agent (1) | 1 | — | — | — | — |
| | Coloring Agent (3) | — | — | 1 | — | — |
| | Coloring Agent (5) | — | 2 | — | — | — |
| | Thickness (μ) | 170 | 180 | 180 | 130 | — |
| Bottom Skin Ply | ABS Resin (1) | 85 | 83 | 85 | — | 91.5 |
| | ABS Resin (2) | 4.5 | 7 | 12.5 | — | — |
| | PS Resin | — | — | — | 79.99 | — |
| | Coloring Agent (5) | 10 | 9.5 | — | — | 8 |
| | Coloring Agent (6) | 0.5 | 0.5 | 2.5 | 0.01 | 0.5 |
| | Calcium Carbonate | — | — | — | 20 | — |
| | Thickness (μ) | 30 | 20 | 20 | 70 | 90 |
| Properties | | | | | | |
| Appearance | | Fair | Fair | Fair | Fair | Fair |
| Light Transmittance (%) | | 1> | 1> | 1> | 1> | 1> |

Starting materials for the multi-ply sheets shown in Table 2 and the used non-woven cloth are as follows.

(1) Non-woven Cloth: Available from Misubishi Rayon Company Limited under the Trade Indication of JB-3F-4

(2) ABS Resin (1): Available from Denki Kagaku Kogyo K.K. under the Trade Name of Denka ABS HM (3) ABS Resin (2): Available from Denki Kagaku Kogyo K.K. under the Trade Name of Denka ABS QF (4) PS Resin: Available from Denki Kagaku Kogyo K.K. the Trade Name of Denka Styrol HI-E-6

(5) Coloring Agent (1): Available from Tokyo Ink K.K. under the Trade Name of DKAB-384Y-7 (Yellow)

(6) Coloring Agent (2): Available from Tokyo Ink K.K. under the Trade Name of DKAB-584Y-9 (Blue)

(7) Coloring Agent (3): Availble from Tokyo Ink K.K. under the Trade Name of KAM-684Y-8 (Green)

(8) Coloring Agent (4): Available from Tokyo Ink K.K. under the Trade Name of PS-483Y-29R (Red)

(9) Coloring Agent (5): Available from Tokyo Ink K.K. under the Trade Name of PS-183Y-13W (White)

(10) Coloring Agent (6): Available from Tokai Carbon K.K. under the Trade Name of Seast 3 (Black)
(11) Calcium Carbonate: Available from Shiraishi Calcium K.K. under the Trade Name of Whiton SB Red Determination of Properties (1) Appearance: The warp of the manufactured jacket and the smoothness of the surface thereof was visually inspected, and those without warp and having a smooth surface were appreciated as fair.
(2) Percent Light Transmittance through the Sheet: Determined generally in accordance with the JISC-6291 Method.

EXAMPLE 9

Through a co-extrusion process, extruded was a double-ply sheet having a 200 micron thick top skin ply made of a composition composed of 100 parts by weight of an ABS resin, 5 parts by weight of an antistatic agent (1) and 3 parts by weight of a nonconductive carbon black, and a 30 micron thick adhesive ply made of a mixture containing 70 wt% of a modified olefinic copolymer and 30 wt% of an ABS resin. Then, the temperature conditions for laminating the double-ply sheet with a non-woven cloth of polyester fibers were determined, using a unit sealer. The results are shown in Table 3. The multi-ply sheet was cut into a 170×300 m/m piece, laminated with a non-woven cloth, folded at 180° C. to form a 5 inch floppy disk jacket size superimposed foldings, and the marginal portions of the superimposed foldings were heat-sealed at 190° C. to produce a jacket.

The thus produced jacket had good appearance without transfer of the non-woven cloth pattern and any deformation, and no bad odor was sensed at the heat treatment in the step of laminating with the non-woven cloth and also in the step of folding under heat.

EXAMPLE 10

Through a co-extrusion process, extruded was a triple-ply sheet having a 225 micron thick top skin layer including a 25 micron thick film made of a composition composed of 100 parts by weight of a high impact strength styrene resin, 3 parts by weight of an antistatic agent (2) and 3 parts by weight of a nonconductive carbon black and a 200 micron thick sheet made of a composition composed of 100 parts by weight of a high impact strength styrene resin and 3 parts by weight of a nonconductive carbon black, and a 25 micron thick adhesive layer made of a mixture containing 50 wt% of a modified polyolefin and 50 wt% of the high impact strength styrene resin. A laminate was prepared from the triple-ply sheet and a non-woven cloth and subjected to measurement using a similar unit sealer as used in Example 9. The results are shown in Table 3. A jacket was produced by folding at a temperature of 170° C. followed by heat-seal at 160° C.

The thus produced jacket had good appearance without transfer of the non-woven cloth pattern and any deformation, and no bad odor was sensed at the heat treatment in the step of laminating with the non-woven cloth and also in the step of folding under heat.

COMPARATIVE EXAMPLE 2

The temperature conditions for laminating with a non-woven cloth were determined, using a hard polyvinylchloride resin in place of the top skin layer of Example 9. The results are shown in Table 3. The tolerable temperature range for the lamination was extremely narrow.

TABLE 3

| | Condition for Lamination | | | Strength of Laminate | Transfer of Non-woven Cloth Pattern |
|---|---|---|---|---|---|
| | Temp. °C. | Pressure Kg/cm$^2$ | Time (Sec.) | | |
| Example 9 | 140 | 0.5 | 0.5 | O | O |
| | 150 | 0.5 | 0.5 | O | O |
| | 170 | 0.5 | 0.5 | O | O |
| | 190 | 0.5 | 0.5 | O | O |
| | 210 | 0.5 | 0.5 | O | O |
| | 220 | 0.5 | 0.5 | O | O |
| 10 | 150 | 0.5 | 0.5 | O | O |
| | 160 | 0.5 | 0.5 | O | O |
| | 180 | 0.5 | 0.5 | O | O |
| | 200 | 0.5 | 0.5 | O | O |
| | 220 | 0.5 | 0.5 | O | O |
| | 230 | 0.5 | 0.5 | O | O |
| Com. Ex. 2 | 150 | 0.5 | 0.5 | Δ | O |
| | 160 | 0.5 | 0.5 | O | O |
| | 170 | 0.5 | 0.5 | O | O |
| | 180 | 0.5 | 0.5 | O | Δ |

The starting materials used, the test methods and appraisals the results thereof will be listed as follows.
Determination of Properties:
1 Strength of Laminate:
   The exterior resin layer was peeled from the non-woven cloth by hands. O indicates that the non-woven cloth was broken, and Δ indicates that the laminate layer was peeled off at the interface.
2 Transfer of Non-woven Cloth Pattern:
   Transfer of pattern was visually observed.
   O indicates that no transfer was observed,
   Δ indicates that some transfer was observed, and
   X indicates that appreciable transfer was observed.
The components used in Examples 9 and 10 and Comparative Example 2 were as follow:
(1) ABS Resin: Available from Denki Kagaku Kogyo K.K. under the Trade Name of Denka ABS, GR-2000
(2) High Impact STrength Styrene Resin: Available from Denki Kagaku Kogyo K.K. under the Trade Name of Denka Styrol HI-R-5
(3) Antistatic Agent (1): Available from Sanyo Kasei Kogyo K.K. under the Trade Name of Chemistat 3033
(4) Antistatic Agent (2): Available from Kao Soap Co., Ltd. under the Trade Name of Electrostripper PC
(5) Carbon Black: Available from Mitsubishi Carbon Co., Ltd. under the Trade Indication of MA-100
(6) Modified Olefinic Copolymer: Available from Mitsubishi Petrochemical Company Limited under the Trade Name of Modic E-300K Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:
1. A jacket for floppy disk comprising an exterior layer of a material which is antistatic and is selected from the group consisting of a styrene base resin layer externally coated with an antistatic agent and a styrene base resin in admixture with at least one of antistatic agents, conductive carbons and conductive metals, and an interior non-woven cloth layer laminated internally of said exterior layer, said styrene base resin being selected from the group consisting of high impact strength styrene resins, mixtures of a styrene resin for general uses mixed with at least 20 wt% of a high impact strength styrene resin, acrylonitrile/styrene/butadiene copolymers, methacrylonitrile/styrene/butadiene copolymers, styrene/butadiene block copolymers, acrylonitrile/acrylic rubber/styrene copolymers, acrylonitrile/ethylenepropylene rubber/styrene copolymers; acrylonitrile/chlorosulfonated ethylene/styrene copolymers, acrylonitrile/α-methyl-styrene/butadiene copolymers, nd blends thereof.

2. The jacket according to claim 1, wherein said exterior layer is a single-ply layer of said antistatic material.

3. The jacket according to claim 1, wherein said exterior layer is double-ply, the first ply being a layer of said antistatic material, the second ply being disposed internally of said first ply and being made of a nonconductive styrene base resin.

4. The jacket according to claim 1, wherein said exterior layer is triple-ply, the second ply being disposed internally of said first ply and made of a non-conductive styrene base resin, the third ply being antistatic and being disposed internally of said second ply and being selected from the group consisting of a styrene base resin ply externally coated with an antistatic agent, and a styrene base resin in admixture with at least one of antistatic agents, conductive carbons and conductive metals.

5. The jacket according to claim 1, wherein said layer comprises a styrene base resin in admixture with 0.1 to 7 parts by weight of an antistatic agent, based on 100 parts by weight of the styrene base resin.

6. The jacket according to claim 5, wherein said antistatic agent is selected from the group consisting of nonionic and anionic surfactants.

7. The jacket according to claim 6, wherein said nonionic surfactants are alkylamine base antistatic agents.

8. The jacket according to claim 7, wherein said alkylamine base antistatic agent is selected from the group consisting of N,N-bis(2-hydroxyethyl) tallow amine, polyoxyethylene lauryl amine and fatty acid esters of polyoxyethylene lauryl amine.

9. The jacket according to claim 1, wherein said exterior layer having antistatic characteristics has a coating of an antistatic agent of a thickness, based on solids content, ranging from 0.001 to 0.1 g/m$^2$.

10. The jacket according to claim 9, wherein said antistatic agent is selected from the group consisting of nonionic and anionic surfactants.

11. The jacket according to claim 1, wherein said layer comprises a styrene base resin in admixture with 3 to 35 parts by weight, based on 100 parts by weight of the styrene base resin, of conductive carbon black.

12. The jacket according to claim 11, wherein said conductive carbon black is selected from the group consisting of Super Conductive Furnace, Electric Conductive Furnace, Ketjen Black EC and acetylene black.

13. The jacket according to claim 1, wherein said layer comprises a styrene base resin in admixture with 2 to 25 parts by weight of a conductive metal, based on 100 parts by weight of the styrene base resin.

14. The jacket according to claim 13, wherein said conductive metal is selected from the group consisting of copper, aluminum, iron, nickel and stainless steel.

15. The jacket according to claim 1, wherein said non-woven cloth is selected from the group consisting of polyester, rayon, aromatic polyamide fiber and rock wool non-woven cloths.

16. The jacket according to claim 1, further comprising an intermediate layer of a nonconductive styrene base resin interposed between said exterior layer and said interior layer, said exterior layer and said intermediate layer containing coloring agents so that the total light transmittance therethrough is lowered to not more than 1%.

17. The jacket according to claim 16, wherein the coloring agent contained in said exterior layer and the coloring agent contained in said intermediate layer have the same color but have different color densities.

18. The jacket according to claim 16, wherein the content of the coloring agent contained in said exterior layer is larger than that contained in said intermediate layer.

19. The jacket according to claim 16, wherein the coloring agent contained in said exterior layer and the coloring agent contained in said intermediate layer have different colors.

20. The jacket according to claim 16, wherein said exterior layer is single-ply and contains said coloring agent.

21. The jacket according to claim 16, wherein said exterior layer is double-ply, the second ply being of nonconductive styrene base resin containing a coloring agent and disposed internally of said first ply.

22. The jacket according to claim 16, wherein said intermediate layer is a double-ply layer including a first ply of a nonconductive styrene base resin containing a white coloring agent and a second nonconductive styrene base resin ply disposed internally of said first ply and containing a coloring agent having a color other than white.

23. The jacket according to claim 16, wherein said intermediate layer is a double-ply layer including a first ply of a nonconductive styrene base resin containing a coloring agent having the same color as that contained in said exterior layer and having a different color density, and a second ply disposed internally of said first ply and composed of a nonconductive styrene base resin containing a coloring agent of different color.

24. The jacket according to claim 1, further comprising an adhesive layer disposed intermediately between said exterior layer and said interior layer and composed of an olefinic copolymer or a mixture of said olefinic copolymer and a styrene base resin.

25. The jacket according to claim 24, wherein said styrene base resin in said adhesive layer is the same as the styrene base resin in said exterior layer.

26. The jacket according to claim 24, wherein said mixture contains said styrene base resin in an amount of not more than 90 wt%.

27. The jacket according to claim 24, wherein said olefinic copolymer is selected from the group consisting of ethylene/vinyl acetate copolymers, ethylene/butene-1 copolymers, copolymers of olefin-2 modified with unsaturated carboxylic acids or anhydrides thereof, and modified ethylene/vinyl acetate copolymers.

* * * * *